United States Patent [19]

Rabotski

[11] Patent Number: 4,891,237
[45] Date of Patent: Jan. 2, 1990

[54] EXPANSION AND COMPRESSION COMPENSATION MECHANISM AND LOAF MOLDING INCORPORATING SAME

[75] Inventor: John Rabotski, Pardeeville, Wis.

[73] Assignee: Oscar Mayer Foods Corporation, Madison, Wis.

[21] Appl. No.: 250,020

[22] Filed: Sep. 27, 1988

Related U.S. Application Data

[63] Continuation of Ser. No. 166,804, Mar. 3, 1988, abandoned, which is a continuation of Ser. No. 904,150, Sep. 5, 1986, abandoned.

[51] Int. Cl.[4] .............................. A22C 7/00; A23P 1/00
[52] U.S. Cl. ....................................... 426/513; 99/351; 99/441; 249/82; 249/121; 426/407; 426/524
[58] Field of Search ............... 426/512, 513, 389, 524, 426/407; 99/351, 441, 448, 427; 249/82, 121; 17/32

[56] References Cited

U.S. PATENT DOCUMENTS

| | | | |
|---|---|---|---|
| 3,580,165 | 5/1971 | Foldenauer | 99/351 |
| 3,646,881 | 3/1972 | Rathjen et al. | 99/351 |
| 4,009,858 | 3/1977 | Borsuk et al. | 99/441 |

*Primary Examiner*—George Yeung
*Attorney, Agent, or Firm*—Joseph T. Harcarik

[57] ABSTRACT

Mechanisms and methods are provided in conjunction with the molding of stuffable food products into a shaped loaf that is suitable for automatic slicing into substantially uniform slices. Included is an expansion and contraction compensation mechanism that includes a ratcheting assembly and a biasing assembly that cooperate to permit adequate expansion of the food product during cooking thereof while still retaining enough biasing force to continually compress the product being molded during contraction which occurs upon chilling the food product.

23 Claims, 6 Drawing Sheets

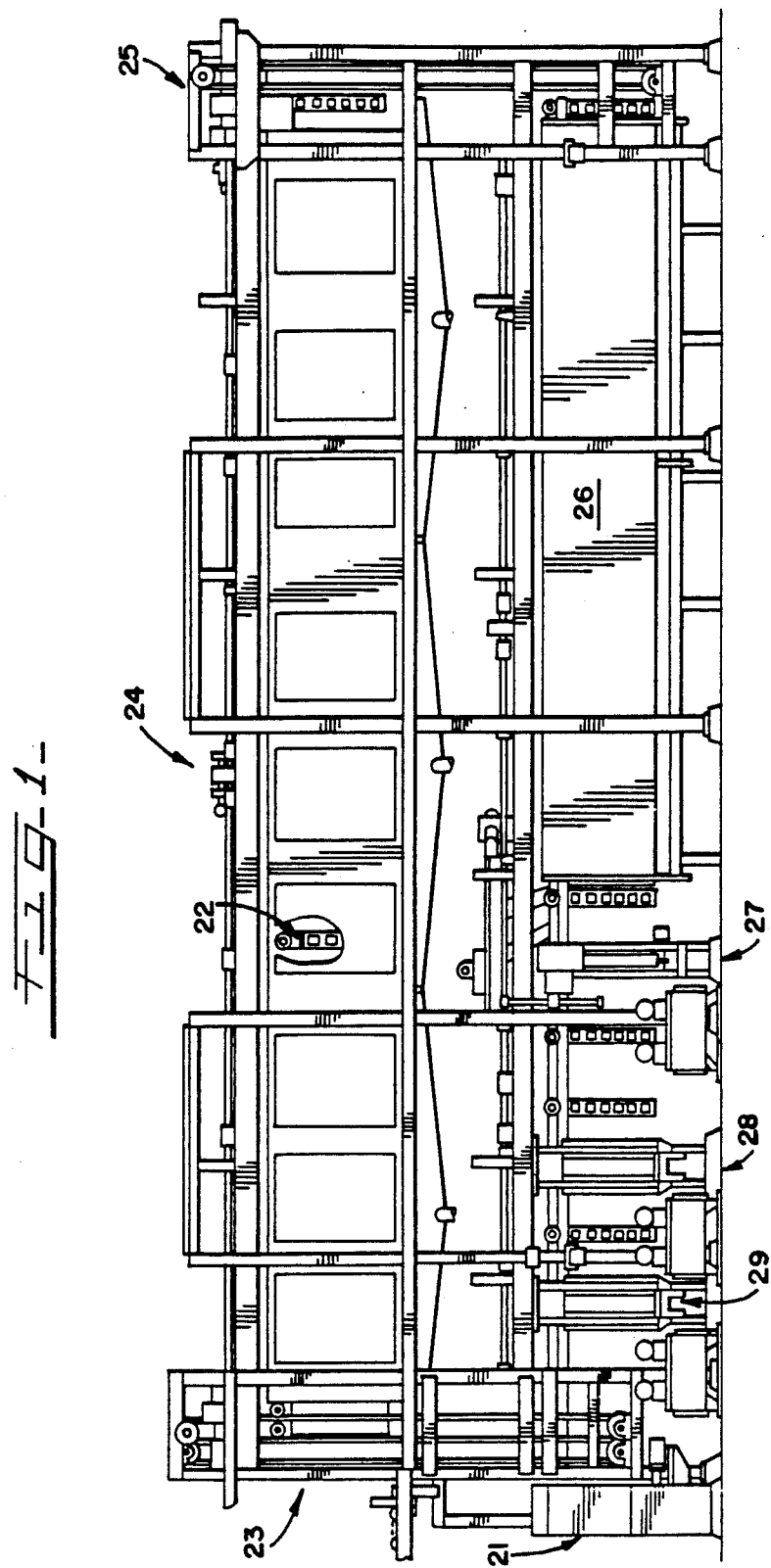

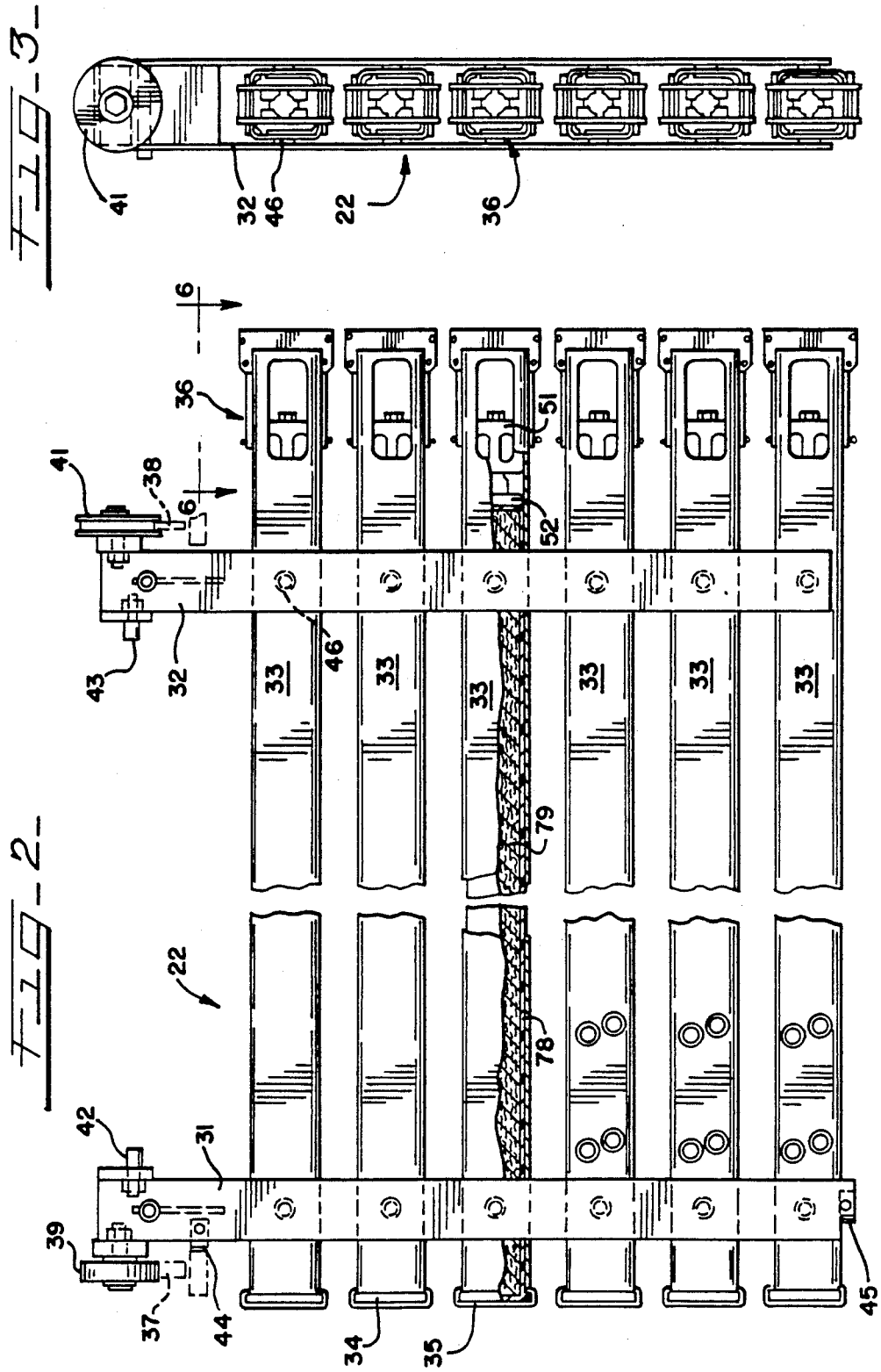

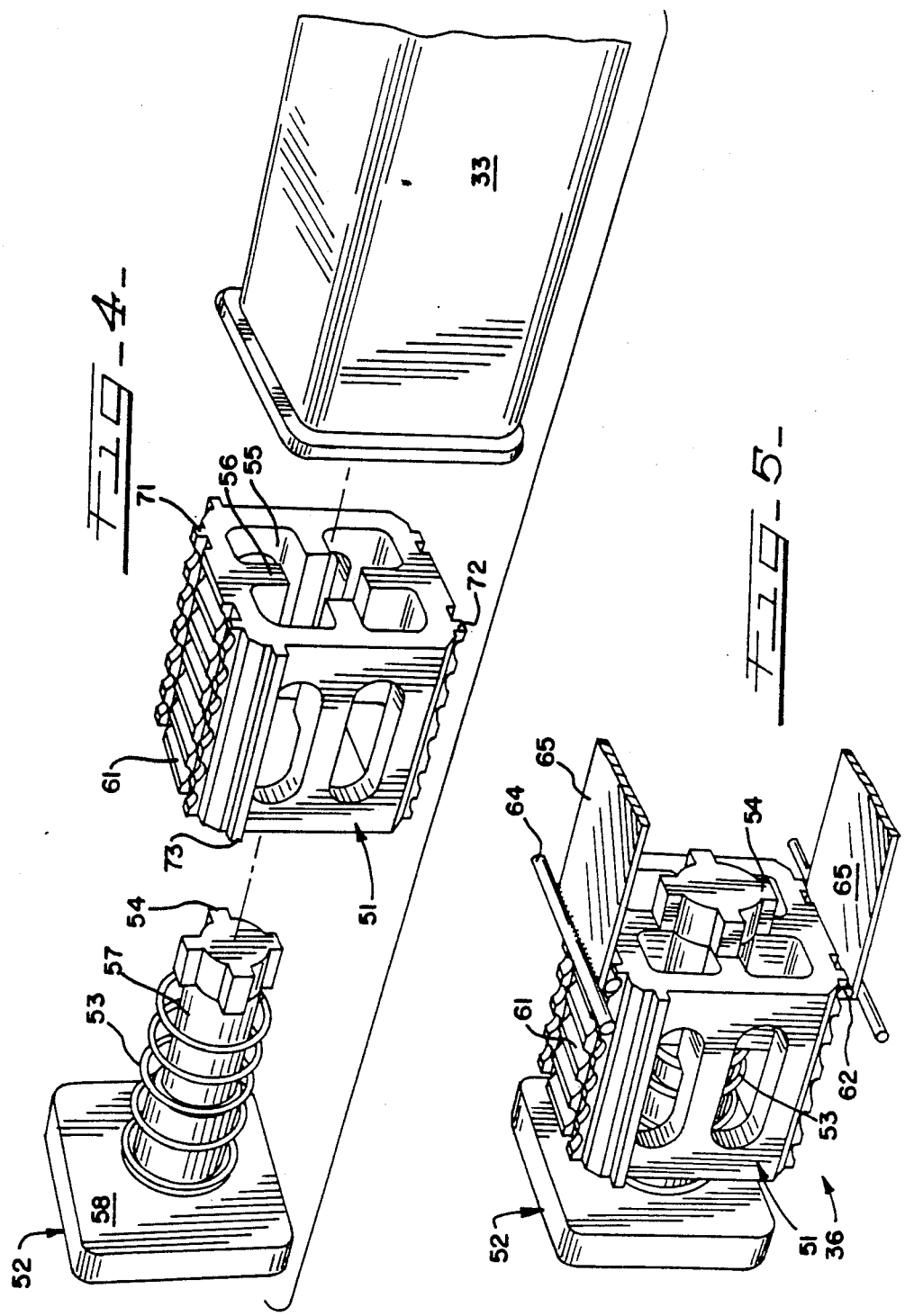

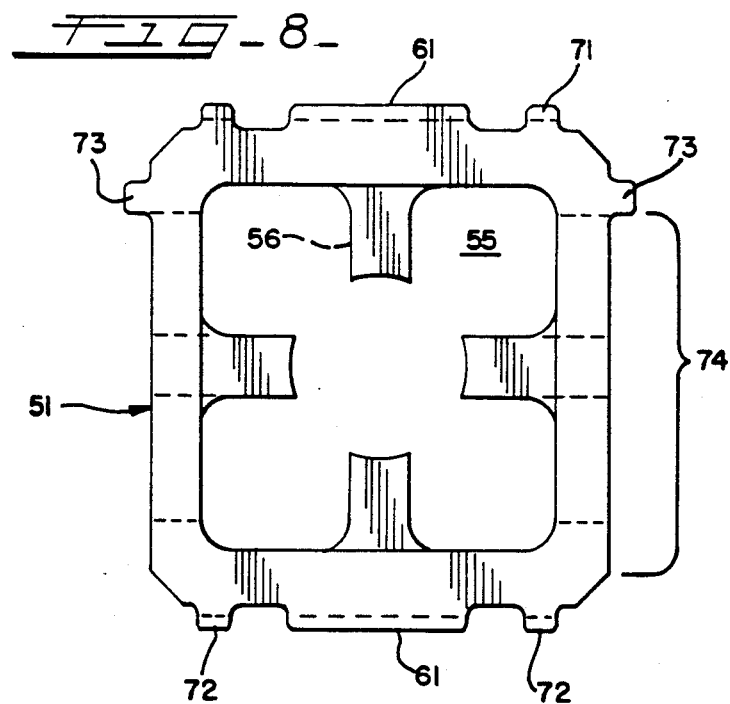
FIG-8-
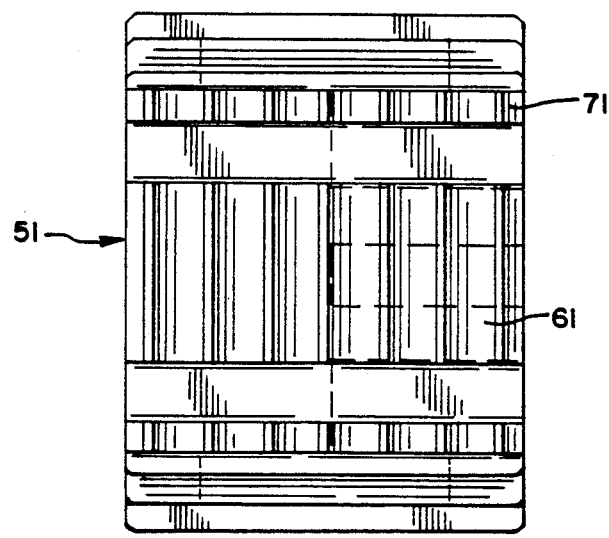
FIG-9-

EXPANSION AND COMPRESSION COMPENSATION MECHANISM AND LOAF MOLDING INCORPORATING SAME

This is a continuation of Ser. No. 166,804, filed 3/3/88, now abandoned, which is a continuation of Ser. No. 904,150, filed 9/5/86, now abandoned.

BACKGROUND AND DESCRIPTION OF THE INVENTION

The present invention generally relates to the molding of loaves of stuffable food material, more particularly to mechanisms and methods that transform stuffable food material into formed and shaped loaves, such transformation taking place within elongated loaf molds which are subjected to a sequence of processing steps including cooking and chilling steps. According to the present invention, an expansion and contraction compensation mechanism is provided which, while it accommodates product expansion during cooking cycle, same also urges a slidably movable plug onto an end of the forming loaf during a chilling cycle. Provision can also be made for facilitating ejection of the formed loaf from the elongated mold.

Systems for continuously making loaf food products within magazines of loaf molds are generally known, for example, from Borsuk et al., U.S. Pat. Nos. 3,948,158 and 4,009,858. In such systems, stuffable food materials are filled into a loaf mold. Typically, a plurality of loaf molds are arranged as a magazine interconnecting vertically aligned and horizontally extending loaf molds, which magazines move through a plurality of processing stations including at least one cooking or heating station and at least one chilling or cooling station, as well as an ejection station for removing the formed loaf products from the molds. While various types of moldable food products may be formed and processed within these types of systems and according to the system of the present invention, they are especially suitable for forming loaf meat products. Such loaf meat products are prepared in a particularly efficient and economical manner with starting materials that are stuffable meat materials including sausage batter, chunk meat, combinations thereof, and the like.

Systems such as those of the Borsuk et al patents incorporate end plug and ratchet take-up mechanisms which interact with the loaf molds in order to accommodate product expansion which is carried out during the cooking cycle or cycles. Further details regarding a plug and ratchet take-up mechanism are illustrated in Orloff et al U.S. Pat. No. 3,982,477. In these types of plug and ratchet take-up mechanisms, provision is made for allowing an end plug to move generally outwardly in order to increase the volume of the loaf mold during cooking. During subsequent cooling, if the plug is not moved in the opposite direction, that is generally inwardly, the end of the loaf thereat will often become damaged or misshapen which can render at least that end portion of the finished and formed loaf unsuitable for subsequent operations such as slicing and packaging into a protective container that is of a generally uniform size and shape. Such damaged loaf product does not slice into a plurality of food product slices having a uniform size, shape and weight.

These types of problems that are associated with molded loaf preparation cycles which include cooking or heating followed by chilling or cooling have been generally recognized, and mechanisms have been provided by virtue of which, after stuffable food material expansion has been accommodated by a generally outwardly directed movement of an end plug, an assembly is provided for applying a generally inwardly directed force in order to squeeze the material during shrinkage, such a squeezing force being applied to the backside of the plug by a hydraulic ram assembly that is activated, typically only once or twice, during cooling. While the timing and extent of movement of the ram assembly can be adjusted by the operator in an effort to have the force applied thereby provide the compensation needed to achieve the desired take-up or inwardly directed pressure, such efforts have limitations because of the need to attempt to estimate the length through which the ram should move and when the movement should be initiated. If the operator's estimates are not correct, compensation for contraction on cooling often is not adequate or precisely timed, with the result that the end of the loaf product is less firm than desirable for subsequent slicing or the like.

In these types of devices, the extent of compensation force that is needed and desired often varies from loaf to loaf, depending primarily upon the precise composition of the stuffable food material within a particular loaf mold and the heat that is applied to and removed from each particular loaf during cooking and chilling thereof. It is to be appreciated that, even when the loaf molds are arranged in magazines, the needed take-up compensation force can vary from magazine to magazine and even from mold to mold within the same magazine. Additionally, these types of take-up compensation mechanisms typically include somewhat bulky external structures such as outside cages which, for a given available floor space, reduce the length of each loaf mold and thereby reduce the amount of stuffable food material that can be formed into a loaf during each cycle.

Heretofore, attempts have been made to utilize flexible liners to encapsulate the food product stuffed within the mold. Generally, gaps develop between the food and the mold, and meat juices or the like accumulate within such gaps and escape from the food product thereby reducing yields and interfering with the formation of a finished product exhibiting desired juiciness. Furthermore, although certain mold release agents have been incorporated into these types of systems in an effort to facilitate ejection of the formed loaves from the apparatus, ejection is not always completely satisfactory, and formed loaves are at times damaged during loaf ejection.

Accordingly, important advantages could be realized in loaf forming systems by improvements which substantially eliminate the aforementioned problems and difficulties. Such are achieved by the present invention which provides expansion and contraction compensation that is carried out substantially automatically and according to the needs of each individual loaf mold during each particular run such that the inside volume of each different mold substantially automatically increases or decreases as needed to the extent that the internal volume of each individual loaf mold is continuously substantially the same as that of the expanding and contracting stuffable food material therewithin. Included in this regard is an expansion and contraction compensation mechanism and method for each individual loaf mold that combines ratchet function and biasing functions in order to accommodate stuffable food material expansion, while the biasing means thereafter generally continuously exerts an inwardly directed force onto an end of the individual loaf mold in order to thereby reduce the volume of that loaf mold while the volume of the loaf therewithin is correspondingly being reduced. Extraction of formed loaves from the loaf molds and retention of desired product juices within the finished product can be facilitated by interposing a flexible liner between the food material and each loaf mold at the time that the food material is stuffed into the loaf mold.

It is accordingly a general object of the present invention to provide an improved system for molding stuffable materials into molded loaves.

Another object of this invention is to provide an improved expansion and contraction compensation assembly for individual loaf molds.

Another object of the present invention is to provide substantially automatic expansion and compression volume compensation during various cycles of a loaf molding operation.

Another object of the present invention is to provide improvements in loaf molding operations that enhance the ability of the device to minimize the chance of loaf damage or the forming of misshapen loaves due to the presence of gaps between the product being molded and the inside surfaces of the mold within which the loaf is being formed.

Another object of this invention is to improve the procedure by which the molded loaves are ejected from the system.

Another object of the present invention is to enhance the product yield of a loaf molding system.

These and other objects, features and advantages of this invention will be clearly understood through a consideration of the following detailed description.

BRIEF DESCRIPTION OF THE DRAWINGS

In the course of this description, reference will be made to the attached drawings, wherein:

FIG. 1 is an elevational view of a system for making a molded loaf product in a generally continuous manner;

FIG. 2 is an elevational view, partially broken away, of a magazine assembly suitable for use within the system illustrated in FIG. 1;

FIG. 3 is an end elevational view of the magazine assembly illustrated in FIG. 2;

FIG. 4 is an exploded perspective view of an end portion of a loaf mold assembly including a preferred arrangement of the expansion and compression compensation mechanism according to this invention;

FIG. 5 is a broken-away perspective view of the expansion and compression compensation mechanism of FIG. 4, shown in assembled condition;

FIG. 8 is an end view of a ratchet plunger having the assembly generally illustrated in FIGS. 4, 5, 6 and 7;

FIG. 9 is a top plan view of the ratchet plunger shown in FIG. 8;

DESCRIPTION OF PARTICULAR EMBODIMENTS

Figure 6:
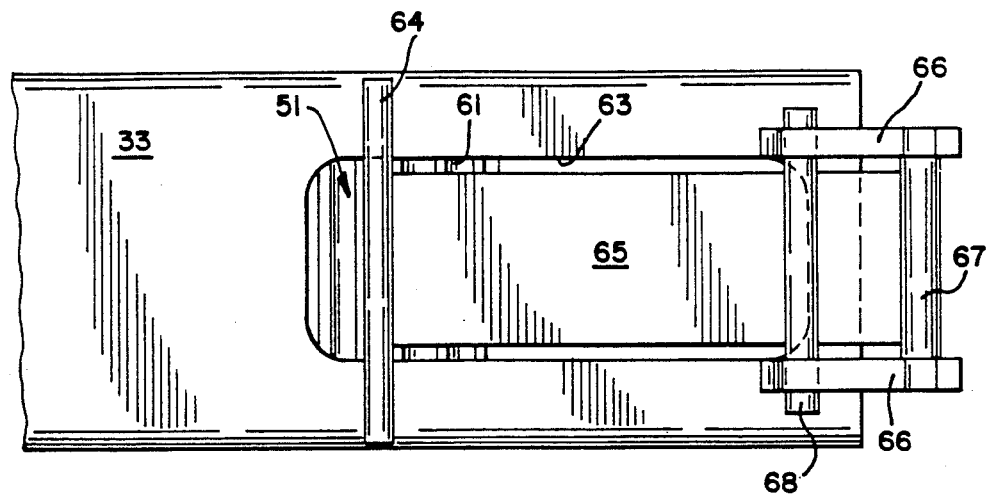
FIG. 6 is a top plan view, generally along the line 6—6 of FIG. 2 and illustrating positioning of the compensation mechanism within an end portion of a loaf mold.

A typical system within which the present invention can be practiced is generally illustrated in FIG. 1, which provides an overall view of a continuous loaf processing system that includes a stuffer assembly, generally designated as 21, at a stuffing station which loads stuffable food material such as meat products into an elongated mold, with the illustrated embodiment including a plurality of such molds arranged vertically from each other as a magazine assembly, generally designated as 22. A lifting transfer assembly, generally designated as 23, moves each magazine assembly 22 to a cooking station, generally designated as 24, and a lowering transfer assembly 25 at the discharge end of the cooking station 24 moves each magazine assembly 22 to the inlet end of a chilling station, generally designated as 26. A knockout station, generally designated as 27, receives the chilled magazine assemblies 22 and pushes the molded product out of each of the molds of the magazine assemblies 22. Once thus emptied, the molds are cleaned at a wash station 28. A release agent can be applied to each mold at station 29, or a release agent can be applied together with a suitable flexible liner, for example in connection with the stuffer assembly 21.

Cooking may be accomplished within the cooking station 24 by any suitable means, such as by hot water spray nozzle assemblies and the like, which cooking results in an overall expansion of the stuffed food material. In order to accomplish rapid processing, the cooked loaves are cooled down within the chilling station 26 by appropriate temperature lowering means, such as cold water that is sprayed onto the outside surface of the loaf molds. Such cooling causes an overall shrinkage in the volume of the meat material which, if not compensated for, causes spacing between the food loaf and the internal sides or surfaces of the molds.

A magazine assembly 22 is more fully illustrated in FIGS. 2 and 3. The illustrated magazine 22 includes a pair of vertically extending and horizontally spaced fork members 31 and 32 which are interconnected by and have interconnected therewith a plurality of elongated generally-tubular loaf molds 33. Molds 33 that are illustrated have elongated bodies are rectangular in cross-section, and they are provided at one end with a peripheral flange 34 for receiving a slip-on cover 35 or the like to close that end of the loaf mold 33. An expansion and contraction compensation mechanism, generally designated as 36, closes the other end of each loaf mold 33.

Each magazine assembly 22 is supported for movement along generally parallel, opposed stationary rails or tracks 37, 38 in association with wheels or rollers 39, 41, respectively, which are mounted by suitable axles onto the fork members 31, 32, respectively. Also mounted generally at the upper ends of the fork members 31 and 32 are indexing pins or studs 42 and 43 which are engaged by a suitable index drive mechanism (not shown) to index the magazine assemblies 22 along the rails or tracks 37, 38. An upper magazine stop 44 and a lower magazine stop 45 are further included. Each loaf mold 33 is secured to the fork members 31 and 32 by suitable means, such as the illustrated welded discs 46.

Referring more particularly to the expansion and contraction compensation mechanism 36, each such mechanism is designed so as to operate generally independently of other like mechanisms on other loaf molds 33. For example, if product in one of the loaf molds 33 of a particular magazine assembly 22 expands and/or contracts to an extent different from product in a neighboring loaf mold 33, then the amount of compensation provided for by each such mechanism 36 will be different and, within reasonable limits, will be the extent of expansion and/or contraction needed to accommodate the particular product within the particular loaf mold 33.

In this regard, the disadvantages of prior arrangements such as hydraulic ram assemblies discussed herein are overcome by the compensation mechanism 36. A substantially constant force of the needed magnitude is provided, and a bulky ram or cage assembly is omitted, which permits the stuffable food material to fill a greater internal volume of each loaf mold 33, which provides the ability to increase product yield without having to increase the floor space covered by a loaf molding system incorporating ram or cage assemblies or the like.

The generally preferred expansion and contraction compensation mechanism 36, which is illustrated in FIGS. 4 through 9, includes a plug assembly that includes a ratchet plunger 51 and an end cover member 52 that are joined together by a suitable locking arrangement such that a biasing member, for example the illustrated compression spring or coil 53, is interposed between the ratchet plunger 51 and the end cover member 52 in a manner that permits relative axial movement therebetween. This movement is either in opposition to or caused by forces provided by the biasing member. The illustrated locking arrangement is provided by dogs 54 at one end of the end cover member 52, which dogs 54 pass through eyes 55 within the ratchet plunger 51 for assembly purposes. Thereafter, appropriate rotation of the ratchet plunger 51 relative to the end cover member 52 generally aligns the dogs 54 with stops or flutes 56 on the ratchet plunger 51. An axial shaft 57 of the end cover member 52 generally spaces its dogs 54 from its end block 58, which has a product engaging surface 59.

A ratchet assembly is provided which includes a plurality of ratchet teeth 61, preferably positioned on the opposing upper and lower surfaces of the ratchet plunger 51. Teeth 61 are sized, structured and positioned for ratcheting engagement with a spring assembly while the ratchet plunger 51 is at rest within or slidably moves within the loaf mold 33. The spring assembly includes a detent 62 which may take the form of a bar or rod that will pass through an opening 63 through each of the top and the bottom of the body of the loaf mold 33. A longer bar 64 or the like may be provided to prevent excessive inward movement of the detent 62 and its leaf spring 65. Each leaf spring 65 is suitably secured to its mold tube 33 in a generally cantilevered fashion so that each detent 62 is urged generally inwardly and onto the ratchet teeth 61 of the ratchet plunger 51. A suitable spring retainer assembly in this regard includes the illustrated retaining members or brackets 66 holding a pivot rod 67 by means of which the leaf spring 65 is pivotally mounted to the retaining brackets 66 and thus to the mold tube 33. A stop pin 68 limits the outward movement of the leaf spring 65 while permitting cantilevered flexing thereof.

Figure 7:
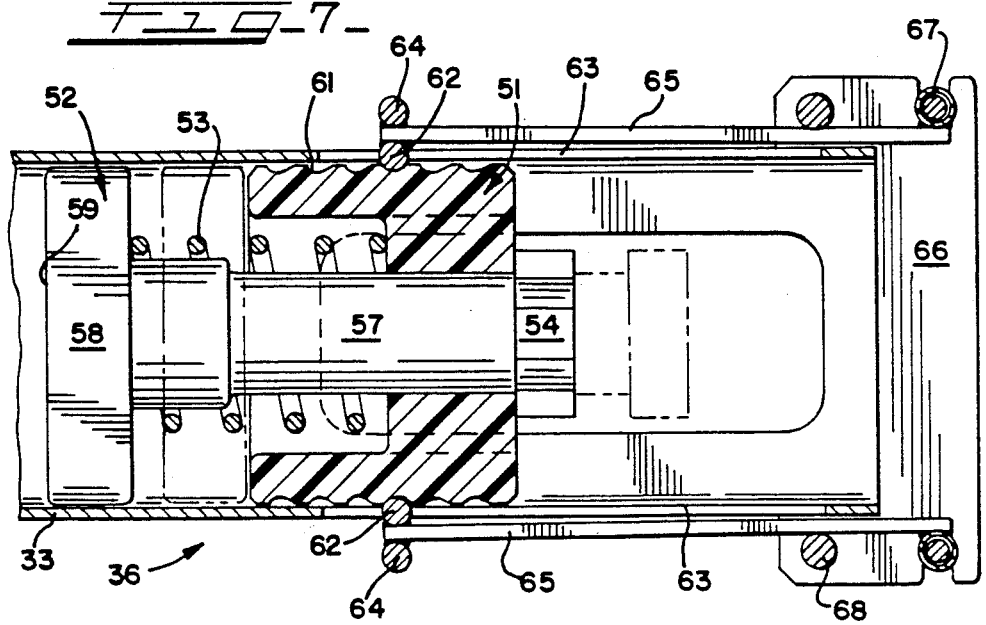
FIG. 7 is a generally longitudinal sectional view through the assembly of FIG. 6.

In operation, stuffable food product such as meat fills the mold tube 33 to the left of the product engaging surface 59 as illustrated in FIGS. 2 and 7. During cooking, this product expands, thereby compressing the coil 53 and moving the end cover member 52 to the right. If and when the end cover member 52 is moved to the phantom location shown in FIG. 7, the end block 58 engages the inwardly facing surface of the ratchet plunger 51. If product expansion continues therebeyond, the ratchet plunger 51 will begin to move in a generally outward direction (to the right in FIG. 7) and can accomplish ratcheting movement of the detent 62 to a tooth 61 to the left or inwardly of the tooth 61 within which the detent 62 had previously rested. Continued expansion can be accommodated for so long as teeth 61 remain available for receiving the detent 62.

When the product begins to cool and thus contract, the ratchet plunger 51 will generally remain at the location to which it may have moved as a result of expansion of the product, and the compressed coil 53 is available to move the product engaging surface 59 in a generally inward direction, as a result of which the product engaging surface 59 follows this end of the product during cooling.

The biasing assembly, especially the coil and the ratchet assembly, are sized, designed and positioned such that the bias force provided by the coil when it is fully compressed within the assembly will be adequate to compress the contracted product so as to retain enough pressure thereon to prevent deformation of or damage to the product, especially the last few inches at the end thereof, caused by inadequate compression permitting the development of gaps and the like within the product and between the product and all inside surfaces of the loaf mold, provided predetermined minimum and maximum product volumes and consistencies are adhered to.

In a typical magazine assembly, this adequate bias force provided by the compressed coil will be greater than 150 pounds of force, preferably at least about 200 pounds, for example between about 200 and 210 pounds and more. If such adequate force values are provided, the end of the resulting meat or other food loaf will be firmly formed so as to be easily and accurately sliced after ejection from the mold. Also, the opposing force supplied by the ratchet assembly must be adequate to permit the coil to be compressed and develop its bias force. This ratchet assembly opposing force is a function primarily of the strength of the leaf springs 65 and the shape of the detents 62 and teeth 61. An opposing force of at least about 400 pounds is typically supplied.

With reference to FIGS. 8 and 9, further details of the preferred ratchet plunger 51 are illustrated thereby. Ratchet plunger 51 is particularly well structured to facilitate thorough cleaning of the apparatus. The sliding engagement between the ratchet plunger 51 and the inside longitudinal surfaces of the mold tube 33 is generally along a plurality of projecting guides, including top guides 71, bottom guides 72, and side guides 73. Particularly significant is the free space or gap area between the respective side guides 73 and bottom guides 72, which gap area, generally shown at 74 in FIG. 8, provides a high degree of cleaning clearance.

Figure 10:
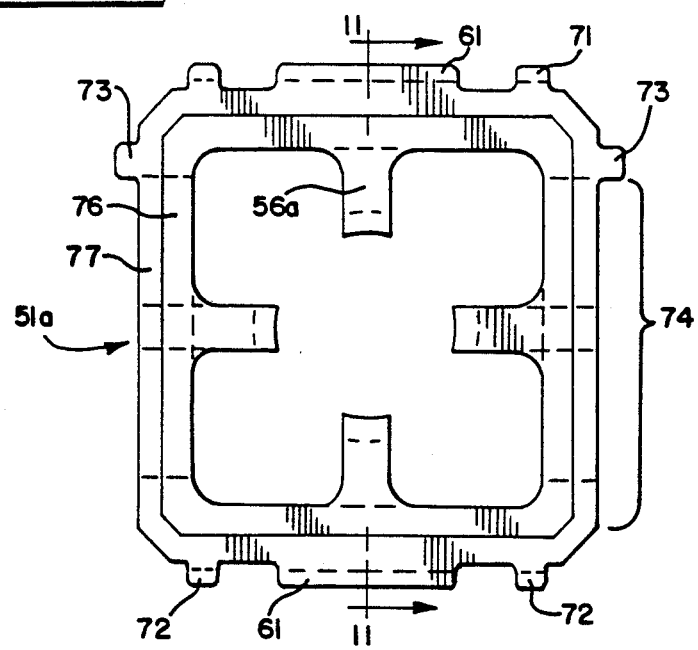
FIG. 10 is a front end view of an alternative ratchet plunger.
Figure 11:
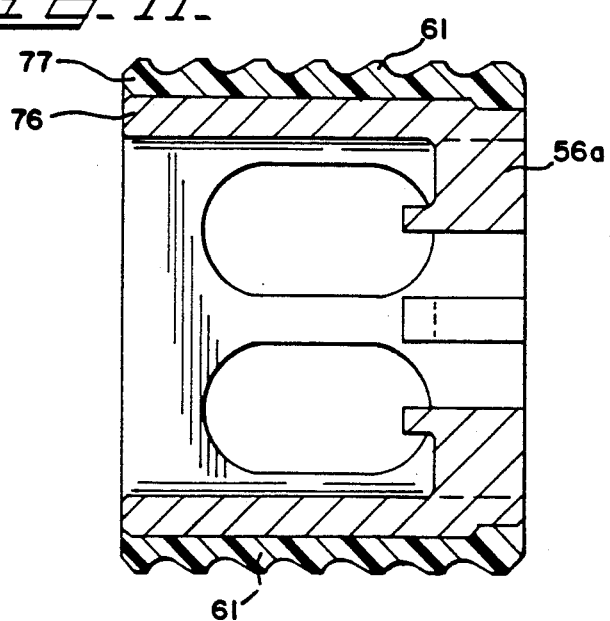
FIG. 11 is a cross-sectional view along the line 11—11 of FIG. 10.

The ratchet plunger 51 is preferably made of a polymeric material exhibiting some lubricity properties, an especially advantageous material being Celcon, which is also a preferred material for the end cover member 52. Typically, for reasons of durability, cleanability and suitability for use with food items, the loaf molds 33 and like will be made of a stainless steel. In the embodiment illustrated in FIGS. 10 and 11, the ratchet plunger 51a is a composite assembly of an especially durable rigid liner member 76 and a generally replaceable shell member 77. For example, the rigid liner member 76 may be made of a stainless steel, while the shell member 77 may be made of a polymer such as Celcon. Otherwise, the ratchet plunger 51a is of substantially the same structure as the ratchet plunger 51, which is generally apparent from the drawings. If desired, the axial thickness of the stops or flutes 56a of ratchet plunger 51a can be generally thinner than the stops or flutes 56 of ratchet plunger 51 inasmuch as flutes 56a are made of a more rigid and durable material than are flutes 56.

In one aspect of the present invention, a flexible liner 78 (FIG. 2) is interposed between the inside wall of the loaf mold 33 and the food material 79 that is stuffed therewithin. The use of such a flexible liner 78 in combination with the compensation mechanism 36 achieves an especially advantageous result. This combination prevents the development of gaps between food product and the liner 78, which gaps adversely affect the ability of the liner 78 to retain product juices within the formed loaf in order to attain maximum weight yields and desired product juiciness. Substantially any type of flexible liner 78 is suitable in this regard provided it readily conforms to the shape and size of the loaf mold 33 and of the product being formed. Such material should also, of course, be suitable for use in contact with food products, and polymeric materials having these properties are generally well-known.

Preferably, stuffing of the food material 79 into each loaf mold 33 is facilitated by the use of a suitable release agent which aids in removing the formed loaf from the mold at the knockout station 27. Typical release agents include lard and silicone compositions, while a particularly suitable release agent has been found to be a blend of lecithin and soybean oil. The combination of the release agent and the flexible liner 78 provides especially advantageous knockout conditions. Flexible liner 78 is preferably removed after knockout.

It will be understood that the embodiments of the present invention which have been described are illustrative of some of the applications of the principles of the present invention. Numerous modifications may be made by those skilled in the art without departing from true spirit and scope of the invention.

I claim:

1. A generally tubular loaf mold apparatus adapted for receiving a stuffable food material to be processed for producing a molded loaf food product, the mold apparatus comprising:
   an elongated generally hollow and generally tubular body member having a cover member for closing one end of said elongated body member and closing means for closing another end of said elongated body member;
   an expansion and contraction compensation mechanism of said closing means, said expansion and contraction compensation mechanism including a plug assembly located within said elongated body member; and
   said expansion and contraction compensation mechanism further includes:
      biasing means for permitting slidable movement of said plug assembly in one direction in opposition to biasing forces provided by said biasing means and in response to a predetermined force of expansion of stuffable food material while being heated and cooked within the elongated body member,
      ratchet means for permitting controlled-increment movement of the plug assembly in said one direction in response to a stuffed food material heating and cooking expansion force generally in excess of said predetermined expansion force, and
      said biasing means further is for slidably moving said plug assembly in a direction generally opposite to said one direction in order to compensate for contraction of said food material while being cooled and chilled within the elongated body member.

2. The loaf mold apparatus according to claim 1, wherein said plug assembly includes a ratchet plunger and an end cover member generally slidably joined together, and wherein said biasing means is generally interposed between said ratchet plunger and said end cover member.

3. The loaf mold apparatus according to claim 2, wherein said biasing means is a compression spring.

4. The loaf mold apparatus according to claim 2, wherein said ratchet means includes a plurality of teeth on said ratchet plunger and a spring assembly having a detent that engages said teeth of the ratchet plunger.

5. The loaf mold apparatus according to claim 4, wherein said spring assembly includes a generally cantilever-mounted leaf spring member.

6. The loaf mold apparatus according to claim 2, wherein said ratchet plunger includes a plurality of projecting generally longitudinal guides peripherally spaced from each other and generally parallel to each other to define gap areas therebetween and between the ratchet plunger and the elongated body member.

7. The loaf mold apparatus according to claim 2, wherein said ratchet plunger is a composite of a rigid inner liner and a replaceable outer shell member.

8. The loaf mold apparatus according to claim 1, further including a flexible liner generally covering the inside surfaces of the elongated body member.

9. A magazine assembly for processing a stuffable food material to produce a loaf food product, the magazine assembly comprising:
   a plurality of elongated tubular mold assemblies and means for supporting said elongated tubular mold assemblies in vertically spaced and horizontally extending relationship to each other;
   said supporting means including members of transporting means for facilitating movement of the magazine assembly between treatment stations;
   means for closing opposite ends of said elongated tubular mold assemblies to hold the food material during processing, at least one of said closing means including a separate expansion and contraction compensation mechanism for each of said elongated tubular mold assemblies; and
   each of said expansion and contraction compensation mechanisms includes a plug assembly slidably located within each of said tubular mold assemblies, said expansion and contraction compensation mechanism further including:
      biasing means for permitting slidable movement of said plug assembly in one direction in opposition to biasing forces provided by said biasing means and in response to a predetermined force of expansion of stuffable food material while being heated and cooked within each elongated tubular mold assembly when the magazine assembly is at a cooking treatment station, ratchet means for permitting controlled-increment movement of the plug assembly in said one direction in response to a stuffed food material heating and cooking expansion force generally in excess of said predetermined expansion force, and said biasing means further is for slidably moving said plug assembly in a direction generally opposite to said one direction in order to compensate for contraction of said food material while being cooled and chilled within the elongated tubular mold assembly when the magazine assembly is at a chilling treatment station.

10. The magazine assembly according to claim 9, wherein said plug assembly includes a ratchet plunger and an end cover member generally slidably joined together, and wherein said biasing means is generally interposed between said ratchet plunger and said end cover member.

11. The magazine assembly according to claim 10, wherein said biasing means is a compression spring.

12. The magazine assembly according to claim 10, wherein said ratchet means includes a plurality of teeth on said ratchet plunger and a spring assembly having a detent that engages said teeth of the ratchet plunger.

13. The magazine assembly according to claim 12, wherein said spring assembly includes a generally cantilever-mounted leaf spring member.

14. The magazine assembly according to claim 9, further including a flexible liner generally covering the inside surfaces of the elongated tubular mold assemblies.

15. In a system for making a molded loaf food product, the system including an elongated loaf mold assembly adapted for receiving a stuffable food material, means for movably supporting the loaf mold assembly for movement thereof along a path transverse to the longitudinal axis of the elongated loaf mold assembly, said elongated loaf mold assembly having a plug member located generally at one end thereof and movably located therewithin and a cover for closing another end of the elongated loaf mold assembly, means for applying heat to the elongated loaf mold assembly at a cooking station for cooking the stuffable food material, means for reducing the temperature of the stuffable food material within the elongated loaf mold assembly at a chilling station for chilling the stuffable food material after cooking thereof, the improvement comprising:

an expansion and contraction compensation mechanism having a plug assembly including said plug member, said plug assembly being located generally within said elongated loaf mold assembly; and said expansion and contraction compensation mechanism further includes:

biasing means for permitting slidable movement of said plug assembly in one direction in opposition to biasing forces provided by said biasing means and in response to a predetermined force of expansion of stuffable food material while being heated and cooked within the elongated loaf mold assembly when same is at the cooking station, ratchet means for permitting controlled-increment movement of the plug assembly in said one direction in response to a stuffed food material heating and cooking expansion force generally in excess of said predetermined expansion force, and said biasing means further is for slidably moving said plug assembly in a direction generally opposite to said one direction in order to compensate for contraction of said food material while being cooled and chilled within the elongated loaf mold assembly when same is at the chilling station.

16. The molded loaf making system according to claim 15, further including a magazine assembly including a plurality of said elongated loaf mold assemblies and means for supporting same in vertically spaced and horizontally extending relationship to each other, wherein each of said elongated loaf mold assemblies includes a separate one of said expansion and compression compensation mechanisms.

17. The molded loaf making system according to claim 15, wherein said plug assembly includes a ratchet plunger and an end cover member generally slidably joined together, and wherein said biasing means is generally interposed between said ratchet plunger and said end cover member.

18. The molded loaf making system according to claim 15, wherein said biasing means is a compression spring.

19. The molded loaf making system according to claim 17, wherein said ratchet means includes a plurality of teeth on said ratchet plunger and a spring assembly having a detent that engages said teeth of the ratchet plunger.

20. The molded loaf making system according to claim 19, wherein said spring assembly includes a generally cantilever-mounted leaf spring member.

21. The molded loaf making system according to claim 15, further including means for positioning a flexible liner for generally covering the inside surfaces of the elongated loaf mold assembly.

22. A method for making a molded loaf food product within a system for movably supporting an elongated loaf mold for movement along a path transverse to the longitudinal axis of the elongated loaf mold, said path including a cooking station and a chilling station, the method comprising:

stuffing a stuffable food material within a loaf mold and closing both ends thereof, said closing of one end being with an expansion and contraction compensation mechanism having a plug assembly generally located within the loaf mold;

heating and cooking said stuffable food material within the loaf mold to develop a predetermined expansion force to thereby effect sliding movement of a portion of the plug assembly in one direction in opposition to biasing forces provided by the plug assembly;

permitting further heating and cooking of the stuffable food material within the loaf mold, when carried out, to develop expansion forces in excess of said predetermined expansion force to thereby effect sliding movement of the plug assembly in said one direction in a controlled-increment ratchet-like movement; and thereafter cooling and chilling said food material within the loaf mold to contract the food material therewithin while substantially simultaneously slidably moving the plug assembly automatically in a direction generally opposite to said one direction in order to compensate for said food material contraction.

23. The method according to claim 22, wherein said stuffing step is generally accompanied by inserting a flexible liner between stuffable food material and the inside surfaces of the elongated loaf mold.

* * * * *